United States Patent [19]
Antoine et al.

[11] Patent Number: 5,394,186
[45] Date of Patent: Feb. 28, 1995

[54] DEVICE FOR THE PROCESSING OF DIGITAL SIGNALS COMING FROM OPTICAL SENSORS

[75] Inventors: Jacques Antoine, Montigny le Bretonneux; Jean-Marc Clairgironnet, Paris; Patrick Vejus, Fontenay le Fleury, all of France

[73] Assignee: Thomson-CSF, Puteaux, France

[21] Appl. No.: 50,629

[22] Filed: Apr. 22, 1993

[30] Foreign Application Priority Data

Apr. 24, 1992 [FR] France ................. 92 05053

[51] Int. Cl.⁶ .............................................. H04N 3/14
[52] U.S. Cl. ..................................... 348/262; 348/207; 382/62
[58] Field of Search ............. 358/209, 213.11, 213.26, 358/213.27, 222, 482, 483; 382/67, 65, 62; H04N 3/14, 3/15, 5/335; 348/222, 294, 274, 275, 250, 231, 232, 262, 207

[56] References Cited

U.S. PATENT DOCUMENTS

| | | | |
|---|---|---|---|
| 4,356,513 | 10/1982 | Yoshimura et al. | 382/67 |
| 4,449,151 | 5/1984 | Yokota et al. | 358/483 |
| 4,459,619 | 7/1984 | Yoshida | 358/293 |
| 4,675,745 | 6/1987 | Suzuki | 358/483 |
| 4,691,114 | 9/1987 | Hasegawa et al. | 358/482 |
| 4,692,812 | 9/1987 | Hirahara et al. | 358/483 |
| 4,712,134 | 12/1987 | Murakami | 358/213.13 |
| 5,036,545 | 7/1991 | Iida et al. | 382/65 |

FOREIGN PATENT DOCUMENTS 0308075  3/1989  European Pat. Off. .

OTHER PUBLICATIONS

Kiver & Kaufman, *Television Simplified*, 7th edition (1973) pp. 23–24, Section 2.6.

*Primary Examiner*—Joseph Mancuso
*Attorney, Agent, or Firm*—Oblon, Spivak, McClelland, Maier & Neustadt

[57] ABSTRACT

The disclosure relates to the processing of sets of digital signals coming from different outputs of an optical sensor such as a line of photo-detectors. There is proposed a device which, singly or severally and after simple programming of the circuits that form it, can be used to make a video transformer for optical sensors. This device comprises chiefly:—several memorization circuits each designed to receive a digital signal coming from one of the outputs of the sensor; —programmable addressing means to write in the memorization circuits and to read these circuits;—change-over or selector means to offer the choice from among different configurations of links between the inputs of the device and the ports of the memorization circuits. Application in particular to the processing Of the digital video signals coming from lines of photo-detectors.

8 Claims, 3 Drawing Sheets

DEVICE FOR THE PROCESSING OF DIGITAL SIGNALS COMING FROM OPTICAL SENSORS

BACKGROUND OF THE INVENTION

The present invention relates to the processing of the digital signals coming from optical sensors and, especially, from linear optical sensors also known as lines or linear arrays of photo-detectors.

The invention relates to devices used to carry out this processing operation and to video transformers constituted by one of these devices or by the association of several of these devices.

A known way of analyzing an image is to use one or more lines of photo-detectors. The length of a line of photo-detectors used, in a camera, as an image sensor depends on the application, desired resolution and format of the image. This line may be constituted either by a monolithic strip when there exists such a strip corresponding to the optical analysis to be performed or by an assembly of several strips. It is thus, for example, that there exist commercially available monolithic strips formed by 2048 and 6000 photo-detectors and strips formed by the joining of three monolithic strips of 2048 photo-detectors each. When the commercially available strips do not correspond to the needs of the assemblies to be made, they are joined end to end optically, with an overlapping of the photo-detectors at the abutting ends. Commercially available strips formed by several monolithic strips are generally mounted back to front with respect to each other on a same mechanical support, but without any optical overlapping.

Different lines of photo-detectors are thus made, and there are known ways of designing a video transformer specific to each line structure, to process the signals given by the line considered; the processing makes it possible to obtain a video signal representing the real position of the photo-detectors in the focal plane of the camera, in a format that is programmable linewise and at a frequency that may be different from the frequency of analysis.

SUMMARY OF THE INVENTION

The aim of the present invention is to make it possible to avoid having to design a new video transformer for each new line.

This is obtained by means of a processing device that comprises memories, means for the addressing of the memories and addition means, and that has a configuration which can be modified to constitute a video transformer by itself or in association with other identical devices.

According to the invention, there is provided a signal processing device comprising n main inputs with n as a whole number greater than 1, to receive digital signals to be processed coming from an optical sensor, a main output to deliver a processed signal in a format that is programmable linewise, n memorizing circuits having writing inputs and reading outputs, change-over or selector means to provide for the choice from among several configurations of links between the main inputs and the writing inputs, first programmable addressing means to provide for the choice from among different addressing operations for writing in the memorization circuits, second programmable addressing means to provide for the choice from among different addressing operations for the reading of the memorization circuits, at least one addition circuit comprising several inputs and one output and linking means to enable at least one configuration of links between the reading outputs and the inputs of the addition circuit, on the one hand, and between the output of the addition circuit and the main output, on the other hand.

BRIEF DESCRIPTION OF THE DRAWINGS

The present invention will be understood more clearly and other characteristics will appear from the following description and from the figures pertaining thereto, of which.

In the different figures, the corresponding elements are designated by the same references.

MORE DETAILED DESCRIPTION

Figure 1:
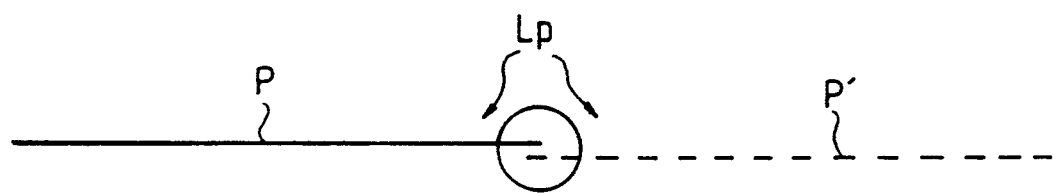
FIGS. 1 and 2 show lines of photo-detectors used with processing devices according to the invention.

FIG. 1 is the drawing of a line of photo-detectors, Lp, formed by the end-to-end joining of two monolithic strips P and P'. In this diagram, although the strips P and P' are commercially available strips that are identical, each comprising 6000 photo-detectors, they have been shown respectively by means of solid lines and dashes in order to make a clearer distinction between them. These two strips have an overlapping zone that is substantially at the middle of a circle in FIG. 1 which has been drawn solely in order to identify this zone more clearly.

Figure 2:
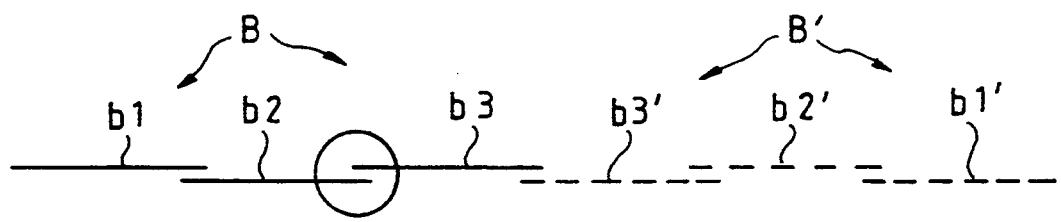

FIG. 2 is the drawing of another line of photo-detectors Lb, formed by the end-to-end joining of two monolithic strips B and B' that are mounted back to front with respect to each other and are each formed by three monolithic strips b1, b2, b3 and b1', b2', b3'. Here too, although the strips B and B' are commercially available strips that are identical, each comprising 3×2048 photo-detectors, they have been shown respectively by means of solid lines and dashes in order to make a clearer distinction between them. FIG. 2 shows five overlapping zones, two of them within the strip B, two within the strip B' and one corresponding to the end-to-end joining of the strips B and B'; a circle has been drawn on FIG. 3 around the zone of overlapping of the monolithic strips b2 and b3 solely in order to identify this zone more clearly.

Figure 3:
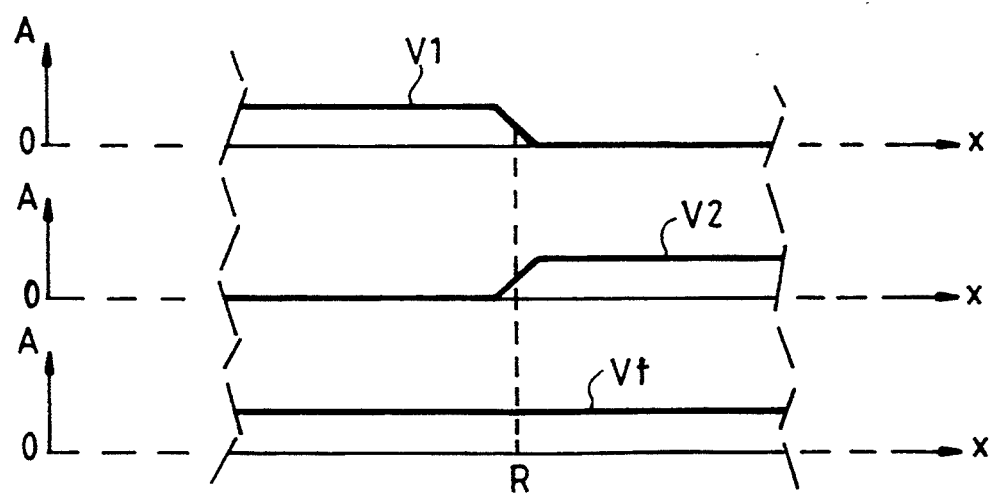
FIG. 3 shows video signals relating to the line according to the invention.
Figure 4:
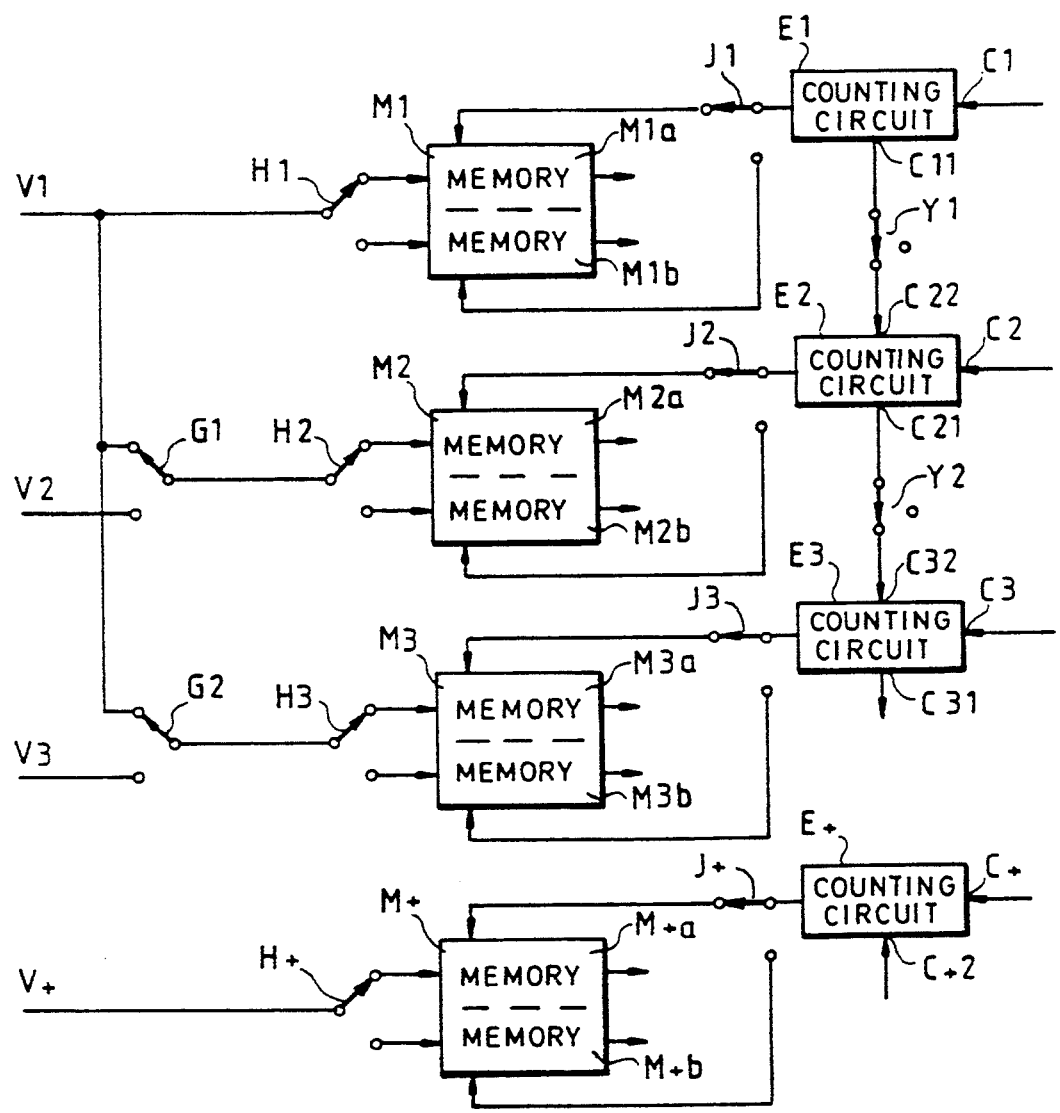
FIGS. 4 and 5 are diagrams illustrating the operation, in writing and in reading mode respectively, of a processing device according to the invention.
Figure 5:
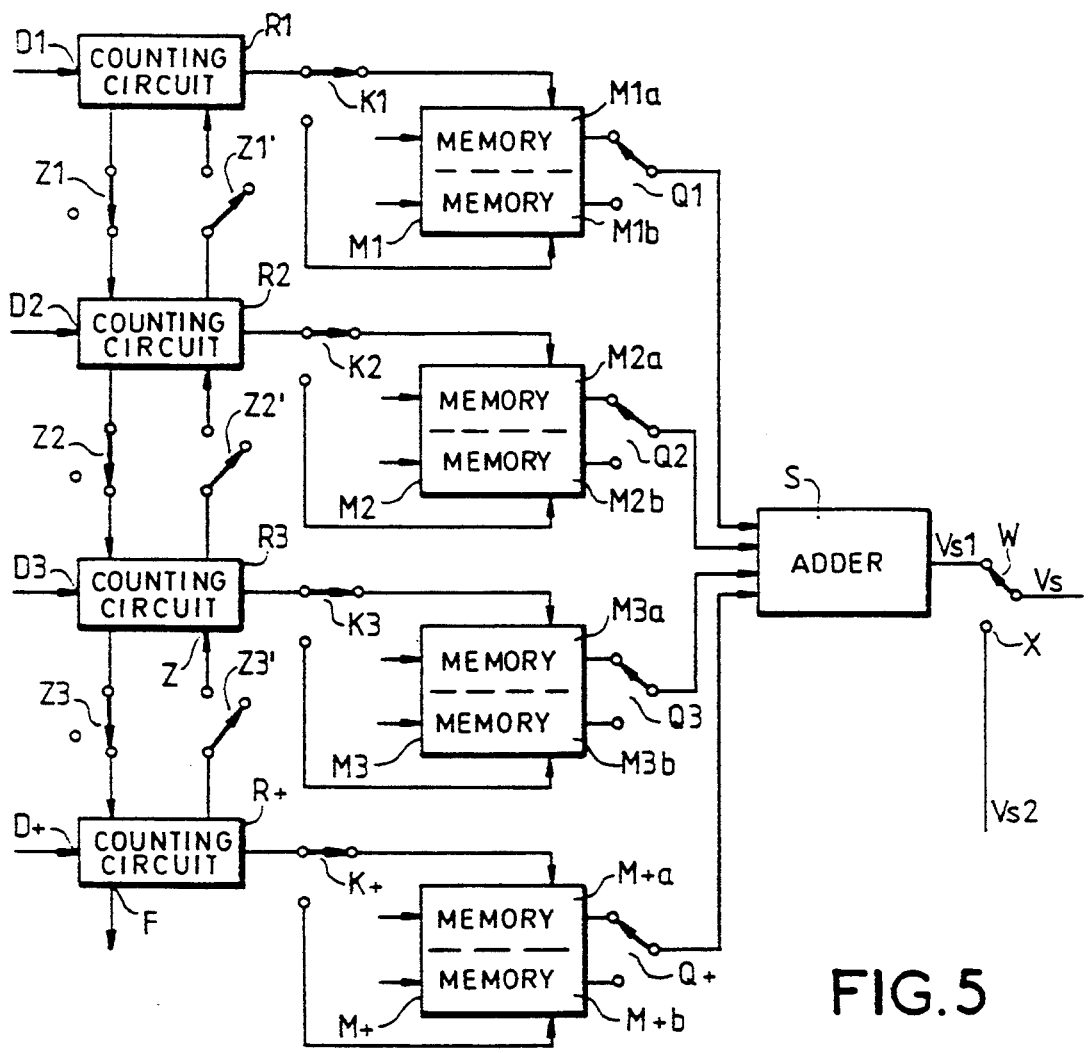
Figure 6:
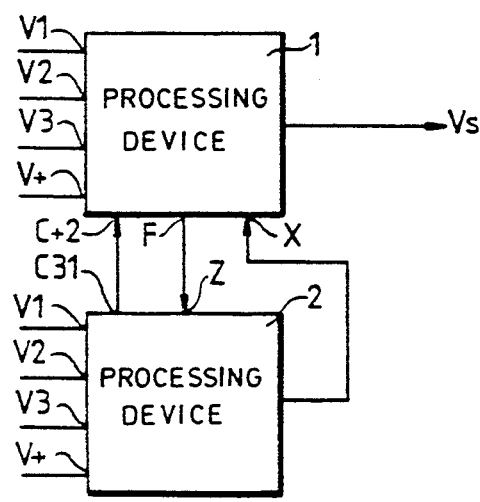
FIG. 6 shows a video transformer according to the invention.

FIG. 3 shows a schematic view, at a given instant and as a function of the x-axis value measured along the line of photo-detectors Lp according to FIG. 1, of the manner of development of the amplitude of the video signals V1 and V2 delivered respectively by those photo-detectors of the monolithic strips P and P' that are located close to and on either side of the point R corresponding to the middle of the zone of overlapping of these two strips P, P'. The processing to which these two video signals must be subjected consists, in particular, in arranging them so that they follow one another in time, the parts of these signals that correspond to the zone of overlapping being combined into only one signal. This processing gives a video signal Vt shown in FIG. 3. Different problems have to be resolved to obtain this signal Vt. Indeed, it is necessary to take account of the fact that, in the assemblies of monolithic strips, the video signals coming from the different strips are not correlated since the reading of the strips is done in parallel, that it is possible that strips of different lengths will abut each other, that a combination has to be effected for the video signals coming from the overlapping zones and that, when two strips abut each other back to front, one of them is read from right to left and the other is read from left to right. Until now, all the video transformers used to carry out the processing of the signals given by a line formed by strips joined end to end have been designed on a case by case basis. FIGS. 4, 5 and 6 show how it is possible to make a video transformer that is more flexible in its use. In these figures the circuits used for precise synchronization, since they are part of the current technology of video transformers, have not been shown, in order to make the drawings clearer and to simplify the explanation.

FIG. 4 shows a simplified diagram of the writing part of a processing device according to the invention. This device has four inputs for video signals: V1, V2, V3, V+. The input V1 is connected to the common terminal of a two-position change-over switch or selector H1, to the first terminal of a selector G1 and to the first terminal of a selector G2; these selectors, like all the other selectors of FIGS. 4 and 5, are shown in the form of mechanical change-over switches or selectors in order to facilitate the understand of the drawings, but in the processing device which has been used as an example for the present description, these different selectors are all electronic selectors. The inputs V1 and V2 are respectively connected to the second terminals of the selectors G1 and G2. The common terminal of the selector G1, the common terminal of the selector G2 and the input V+ are connected respectively to the common terminals of three two-position selectors H2, H3, H+.

The device according to FIG. 4 also comprises four memorizing circuits M1, M2, M3, M+, each constituted by two random-access memories (RAMs), M1a, M1b, M2a, M2b, M3a, M3b, M+a, M+b. Of the two memories of one and the same memorization circuit, one is used in writing mode and the other is used in reading mode, and this is done in a manner that alternates in time. The selectors H1, H2, H3, H+ make it possible to choose that one of the two memories, among the memorization circuits M1, M2, M3, M+, which is in writing mode. FIG. 4 corresponds to an instant at which it is the memories M1a, M2a, M3a, M+a that are used in writing mode and, hence, M1b, M2b, M3b, M+b that are used in reading mode. This use in writing mode is achieved by an addressing by means of counting circuits E1, E2, E3, E+, the outputs of which respectively connected to the common terminals of selectors J1, J2, J3, J+. The first terminals of these selectors are respectively connected to the write addressing inputs of the memories M1a, M2a, M3a, M+a while the second terminals are respectively connected to the write addressing inputs of the memories M1b, M2b, M3b, M+b. Each of the counting circuits E1, E2, E3, E+ has a counting input C1, C2, C3, C+ and can be programmed to work, as desired, in count-up mode or in count-down mode, and to count only to a maximum given value. As for the counting circuits E2, E3 and E+, they have an auxiliary counting control input C22, C32, C+2. The input C22 of the counting circuit E2 is connected to an auxiliary output C11 of the counting circuit E1 through a two-position selector Y1 and, when the change-over Y1 is closed, the counting circuit E1 starts counting only when the counting circuit E1 passes through a given value called a triggering value. In the same way, the input C32 of the counting circuit E3 is connected to an auxiliary output C21 of the counting circuit E2 through a two-position selector Y2 and, when the change-over Y2 is closed, the counting circuit E3 is triggered when the counting circuit E2 passes through a given value called a triggering value.

The counting circuit E3 itself also has an auxiliary output C31 which gives a signal when the circuit E3 passes through a given triggering value.

The assembly according to FIG. 4, by itself or in association with one or more identical assemblies, enable the writing, in memory, of video signals coming from different types of linear optical sensors, by a simple programming of the positions of the different selectors and of the stopping of the counting.

On an exemplary and non-restrictive basis, the use of the assembly according to FIG. 4 shall be studied for the writing, in memory, of the video signals coming from lines of photo-detectors such as those shown in FIGS. 1 and 2, with overlappings that, at each instance, relate to 30 photo-detectors of one end of a monolithic strip. In these examples, the strips P and P' are mounted back to front with respect to each other as are the strips B and B', and the strips b1, b2, b3 are all mounted in the same direction, as are the strips b1', b2', b3'. The same conditions of use will be used again to demonstrate the use of the assembly according to FIG. 5.

In the case of the use of a line according to FIG. 1, apart from the selectors H1, H2, H3, H+ and J1, J2, J3, J+ which may be either in the high position or in the low position, the selectors G1, G2 and Y1, Y2 are in the positions indicated in FIG. 4. The video signal given by the strip P is applied, after analog-to-digital conversion, to the input V1 of a first assembly according to FIG. 4 while the video signal given by the strip P' is applied to the input V+ of the first assembly and to the input V1 of a second assembly. The maximum values and the triggering values of the counting circuits E1, E2, E3 are programmed in the first assembly so that E1 counts from 0 to 2047, E2 from 0 to 2047 when E1 has reached the value 2047 and E3 from 0 to 1903 when E2 has reached the value 2047. These counting operations are carried out in synchronism with the supply of digital signals coming from the strip P. The counting circuits E1, E2, E3 of the second assembly according to FIG. 4 count in synchronism with the supply of the digital signals coming from the strip P'. This is also the case with the counting circuit E+ of the first assembly. These circuits E1, E2, E3 of the second assembly and E+ of the first assembly carry out counting operations, respectively and one after the other, from 0 to 2047, 0 to 2047, 0 to 1873 and 0 to 29. This is obtained by the programming of their maximum values and of the triggering values of these circuits and by the addition of a link between between the output C31 of the counting circuit E3 of the second assembly and the counting control input C+2 of the counting circuit E+ of the first assembly. This method of writing makes it possible, in a first assembly, to have the signals of the strip P corresponding to the overlapping zone at the addresses 1874 to 1903 of the memory M3a and the signals of the strip P' corresponding to the overlapping zone at the addresses 0 to 29 of the memory M+. It must be noted that the memories M+a and M+b are chosen so as to have far smaller dimensions than the other memories of the assembly according to FIG. 4 owing to the fact that, in the example described, they have been designed solely in order to be used for the storage relating to these zones of overlapping.

In the case of the use of a line according to FIG. 2, the selectors G1, G2 and Y1, Y2 are in the reverse position to the one shown in FIG. 4, and the digital signals corresponding to the strips b1, b2, b3 of FIG. 2 are applied respectively to the inputs V1, V2, V3 of a first assembly according to FIG. 4, while the digital signals corresponding to strips b1', b2', b3' are respectively applied to the inputs V1, V2, V3 of a second assembly; furthermore, the digital signal corresponding to the strip b3' is applied to the input V+ of the first assembly. The counting circuits count at the rate of supply of the digital signals received by the memories for which they control the addressing in writing mode. In a first assembly, the first three of the counting circuits E1, E2, E3, E+ count from 0 to 2047 and the circuit E+ counts from 0 to 29. In the second assembly, the counting circuits E1, E2 count from 0 to 2047 and the circuit E3 from 0 to 2017 and the counting circuit E+ of the first assembly starts counting when it receives, at its counting control input C+2, a signal coming from the output C31 of the counting circuit E3 of the second assembly and announcing that this circuit E3 has reached the count 2017. Thus, the video signals corresponding to the zone of overlapping between the strips B and B' are stored in the first assembly at the addresses 2018 to 2047 of the memory M3a for the strip B and at the addresses 0 to 29 of the memory M+ for the strip B'.

FIG. 5 is the simplified diagram of the reading part of the processing device, the writing part of which has been described with the help of FIG. 4. This figure will show how it is possible, with an appropriate reading, for the processing, which had started in the writing part, of signals coming from assemblies of monolithic strips to be completed in the reading part. An examination will be made of two examples of use which, naturally, will correspond to the sequence of the operations that are described here above and have led to the memorizing of the video signals coming from the strips according to FIGS. 1 and 2.

The use, in reading mode, of the memories M1a, M2a, M3a, M+a of FIG. 5 is done by an addressing operation by means of counting circuits R1, R2, R3, R+, the counting inputs of which are respectively referenced D1, D2, D3, D+ and the addressing signal outputs of which are connected respectively to the common terminals of four two-way selectors K1, K2, K3, K+. From the counting circuit R1 to the counting circuit R2, there is a link comprising a two-position switch Z1. The link is designed to enable the triggering, when the switch Z1 is closed, of the counting circuit R2 only when the circuit R1 has reached a given value called a triggering value. Five other links of the same type exist respectively from R2 to R1 with a switch Z1', from R2 to R3 with a switch Z2, from R3 to R2 with a switch Z2', from R3 to R+ with a switch Z3 and from R+ to R3 with a switch Z3'. In FIG. 5, the input of the counting circuit R3 corresponding to the link of R+ to R3 has been referenced Z. Furthermore, the counting circuit R+ has an output, known as an external output, F, also designed to give a signal when the counting circuit R+ has reached a given triggering value.

The first and second terminals of the selectors K1, K2, K3, K+ are respectively connected to the read addressing inputs of the memories M1a, M2a, M3a, M+a and M1b, M2b, M3b, M+b; these memories are those that appear already in the diagram according to FIG. 4. Four two-way selectors Q1, Q2, Q3, Q+, the common terminals of which are respectively connected to the four inputs of an adder S, are associated with the memorization circuits M1, M2, M3, M+: their first terminals are respectively connected to the outputs of signals of the memories M1a, M2a, M3a, M+a and their second terminals to the outputs of signals of the memories M1b, M2b, M3b, M+b. The output of the adder S gives a signal referenced Vs1 to the first terminal of a two-way selector, W, the second terminal of which, referenced X, receives a signal Vs2 and the common terminal of which gives a signal Vs. A clock circuit, not shown, gives a signal for the control of the selector, W, and counting signals to the inputs D1, D2, D3, D+ at a rate proper to this clock circuit. To permit this use in reading mode of the memories M1a, M2a, M3a, M+a, the selectors K1, K2, K3, K+, Q1, Q2, Q3, Q+ are in the position in which they are drawn in FIG. 5; and it must be noted that, at the same time, the memories M1b, M2b, M3b, M+b being used in writing mode, the selectors H1, H2, H3, H+ and J1, J2, J3, J+ are in the reverse position to the one in which they are shown in FIG. 4, i.e. they are in the low position.

For the reading of a line of photo-detectors according to FIG. 1 or according to FIG. 2, two assemblies according to FIG. 4 are used. These are the two assemblies comprising the memories in which, during the writing operation considered, the information given by the line of photo-detectors has been stored.

In the case of a line of photo-detectors according to FIG. 1, taking account of the way in which it had been indicated, by means of FIG. 4, that the information elements had been memorized, the reading is done as described hereinafter.

During the reading, the processing consists in reading the information elements contained in the memory in an order such that the signals coming from this reading operation correspond to the signals coming from the reading of a line of photo-detectors formed by only one monolithic strip. To this end, it will therefore be necessary to read successively, in the first assembly, the contents of the memories M1a, M2a, M3a and simultaneously, in synchronism with the last 30 information elements contained at the addresses 1874 to 1903 of the memory M3a, the 30 information elements contained from the address 29 up to the address 0 of the memory M+a; this simultaneous reading pertains to the information elements of the overlapping zone between the strips P and P' according to FIG. 1; what will remain to be done, again successively, will be to read the information elements contained in the second assembly at the addresses 1873 to 0 of the memory M3a, then at the addresses 2047 to 0 of the memory M2a, then at the addresses 2047 to 0 of the memory M1a. To do this, the two assemblies are programmed as follows. In the first assembly, the selectors Z1, Z2, Z3, Z1', Z2', Z3' are in the position that they occupy in FIG. 6 and the counting circuits R1, R2, R3, R+ have their maximum values and their triggering values which are programmed to enable counting respectively from 0 to 2047, 0 to 2047, 0 to 1903 and 29 to 0 with triggering of the counting circuit R2 when the counting circuit R1 has finished counting, triggering of the circuit R3 when the circuit R2 has finished counting, triggering of the circuit R+ when the circuit R3 goes from 1873 to 1874. It is the circuit R+ which, when it has finished counting, triggers the reading in the second assembly by means of a link set up to this effect between the external output F of the counting circuit R+ and the input Z of the circuit R3 of the second assembly. In the second assembly, the selectors Z1, Z2, Z3, Z3' are open, the selectors Z2', Z1' are closed and the counting circuits R3, R2, R1 have their maximum values and their triggering values which are programmed so that the counting circuit R3 of the second assembly, triggered by the counting circuit R+ of the first assembly, counts from 1873 to 0 and then triggers the circuit R2, which counts from 2047 to 0 and then triggers the circuit R1, which counts from 2047 to 0. When the counting circuit R3 of the second assembly is triggered by the passage from 0 to 30 of the circuit R+ of the first assembly, it counts from 1874 to 0, then triggers the circuit R1 and stops. Similarly, the circuit R1 counts from 2047 to 0 and then stops. The addresses thus given to the memories M1a, M2a, M3a, M+a of the first assembly and to the memories M3a, M2a, M1a of the second assembly by the counting circuits provide for a reading of these memories. The reading signals are added up in the adder S of the first assembly to give a signal Vs1 which is the processed-video signal corresponding to the part of the line of photo-detectors which goes from the beginning of this line up to and including the overlapping zone. Similarly, the second assembly gives a video signal Vs2 to the output of its adder S, this video signal Vs2 being the processed video signal corresponding to the part of the line of photo-detectors going from the overlapping zone, but not including this zone, up to the end of the line.

The final processing operation then, to obtain the complete video signal Vs of the line of photo-detectors, consists in bringing together, on one and the same conductor, the signals Vs1 and Vs2 which are successive in time owing to the successive addressing operations by which they have been obtained. To this end, the selector W of the first assembly is placed in the high position which it occupies in FIG. 5 as soon as the counting circuit R1 is triggered, then the selector W is flipped over to the low position under the action of the signal given by the external output, F, of the counting circuit R+, i.e. under the action of the signal which also has the role of triggering the reading in the second assembly; as for the selector W of the second assembly, it is left permanently in the high position.

In the case of the reading of a line of photo-detectors according to FIG. 2, the selectors take the same positions and the operations are substantially identical except that, in addition to the zone of overlapping between the strips B and B', it is necessary to take account of the zones of overlapping between the strips b1 and b2, b2 and b3, b3' and b2', b2' and b1', i.e. the programming of the two assemblies is done in such a way that:

in the first assembly, the counting circuit R1 counts from 0 to 2047 and gives its last 30 addresses, 2018 to 2047, in synchronism with the first 30 addresses 0 to 29 of the circuit R2;

in the first assembly, the circuit R2 counts from 0 to 2047 and gives its last 30 addresses, 2018 to 2047, in synchronism with the first 30 addresses 0 to 29 of the circuit R3;

in the first assembly, the circuit R3 counts from 0 to 2047 and gives its last 30 addresses, 2018 to 2047, in synchronism with the first 30 addresses 29 to 0 of the circuit R+ which counts from 20 to 0;

in the second assembly, the circuit R3, triggered by the end of the counting by the circuit R+ of the first assembly, counts from 2017 to 0 and gives its last 30 addresses 29 to 0 in synchronism with the first 30 addresses 2047 to 2018 of the circuit R2;

in the second assembly, the circuit R2 counts from 2047 to 0 and gives its last 30 addresses in synchronism with the first 30 addresses 2047 to 2018 of the circuit R1 which, for its part, counts from 2047 to 0.

FIG. 6 is the electrical diagram to be set up in order to obtain, with two processing devices 1, 2, a video transformer that can carry out the reading of a line of photo-detectors according to FIGS. 1 and 2. These are devices that conform, in writing mode, to the diagram of FIG. 4 and, in reading mode, to the diagram of FIG. 5, it being understood that this conformity does not take account of the position of the selectors and switches which, as has been seen, varies between the two devices and can even vary during operation.

In the case of a line of photo-detectors according to FIG. 1, the signal of the strip P is applied to the input V1 of the device 1 and the signal of the strip P' is applied to the input V+ of the device 1 and to the input V1 of the device 2. Three links are set up between the two devices: between the output C31 of the second assembly and the input C+2 of the first assembly, between the output F of the first assembly and the input Z of the second assembly and between the common terminal of the selector W of the second assembly and the terminal X of the first assembly. The output of the video transformer is constituted by the common terminal of the selector and of the device 1: it is this output that delivers the processed video signal Vs.

In the case of a line of photo-detectors according to FIG. 2, the only differences relating to the description of the foregoing paragraph relate to the signals applied to the video inputs of the devices: to the inputs V1, V2, V3, V+ of the device 1, there are respectively applied the digital video signals coming from the strips b1, b2, b3, b3' and to the inputs V1, V2, V3 of the device 2, there are respectively applied the digital video signals coming from the strips b1', b2', b3'.

The invention is not limited to the examples described: it is thus that the devices described can used with types of lines of photo-detectors other than the two lines that have been studied and, especially, with lines calling for only one device or calling for more than two cascade-connected devices, where the output signal of one of the devices is applied to the input X of the following device.

Similarly it is possible, without departing from the framework of the invention, to make devices where all the memorization circuits have the same memory capacity, where the number of memorization circuits is reduced to three or even two or exceeds four, where each memorization circuit comprises only one memory if it is possible to write in this memory and to read it at a speed compatible with the signal processing operation to be performed. Furthermore, instead of using a single adder through which there pass all the output signals of the memorization circuits, it is possible to use several adders, each one of which, for example, receives the output signals of two memorization circuits. It is also possible to allow the passage, through the adder or adders, of only the output signals of the memorization circuits which pertain to overlapping zones, the other output signals of the memorization circuits being applied directly to an output selector such as W.

It must be noted furthermore that, in the case of a line or a portion of a line of photo-detectors formed by an odd number of monolithic strips to be processed in two successive processing devices, it is useful to process identical line lengths in each device, so as to have a same duration of use of the two devices in reading as well as in writing modes. Thus, for example, with a line formed by five monolithic strips, it would be useful to process the signals coming from the first strip, the second strip and the first half of the third strip in the first processing device and the signals coming from the rest of the line in the second processing device.

In general, the invention can be applied to the processing of the signals coming from all kinds of optical sensors, whether these are linear or formed by photosensors distributed on a surface. It is enough that these sensors should deliver sets of signals that are distinct from one another at several outputs and that, after transposition into digital form, these signals should be processed to be given in an ordered way, at a common output at a given rate with, as the case may be, overlappings necessitating additions between certain of the signals coming from distinct outputs of the sensor.

What is claimed is:

1. A configurable device for processing signals from sensors, comprising:
   n inputs, n being a whole number greater than 1, connected to outputs of said sensors;
   n memories, corresponding to said n inputs, for storing signals corresponding to signals which are output by said sensors;
   a connecting means, arranged between said n inputs and said n memories, for connecting, during a writing of information from said sensors to said n memories, said n inputs to said n memories in a plurality of configurations using at least one switch, a first of said configurations connecting a first one of said n inputs to a first one of said n memories and connecting, using said at least one switch, a second one of said n inputs to a second one of said n memories, and a second of said plurality of configurations connecting said first one of said n inputs to said second one of said n memories, using said at least one switch, wherein one of said plurality of configurations is selected depending on a number of said sensors;
   addressing means, connected to said n memories, for controlling addressing during a reading of and said writing to said n memories; and
   combination means, connected to said n memories, for combining, during said reading, said signals stored in said n memories and outputting a result of said combining.

2. A device according to claim 1, wherein:
   said connecting means, in said second configuration, disconnects said second one of said n inputs from said n memories using said at least one switch.

3. A device according to claim 1, wherein said n memories each comprise two portions, said device further comprising:
   a plurality of selection means comprising a first selection means connected between said n memories and said connection means, and a second selection means connected between said n memories and said combination means, for alternating a connection between said n inputs and said two portions of each of said n memories, and for alternating a connection between said two portions of each of said n memories and said combination means such that as a first of said portions of said n memories is being written to, a second of said portions of said n memories can be read from and outputted to said combination means.

4. A device according to claim 1, wherein said combination means comprises an adder for successively adding said signals stored in said n memories.

5. A configurable device for processing signals from sensors, comprising:
   at least two assemblies connected to different ones of said sensors, each of said assemblies including:
   n inputs, n being a whole number greater than 1, connected to outputs of said sensors;
   n memories, corresponding to said n inputs, for storing signals corresponding to signals which are output by said sensors;
   a connecting means, arranged between said n inputs and said n memories, for connecting, during a writing of information from said sensors to said n memories, said n inputs to said n memories in a plurality of configurations using at least one switch, a first of said configurations connecting a first one of said n inputs to a first one of said n memories and connecting, using said at least one switch, a second one of said n inputs to a second one of said n memories, and a second of said plurality of configurations connecting said first one of said n inputs to said second one of said n memories, using said at least one switch, wherein one of said plurality of configurations is selected depending on a number of said sensors;
   addressing means, connected to said n memories, for controlling addressing during a reading of and said writing to said n memories; and
   combination means, connected to said memories, for combining, during said reading, said signals stored in said n memories and outputting a result of said combining;
   wherein said combination means of a first of said assemblies includes an input for combining an output of said combination means of a second of said assemblies with the signals stored in said n memories of said first of said assemblies.

6. A device according to claim 5, wherein each of said connecting means of each of said assemblies, in said second configuration, disconnects said second one of said n inputs from said n memories using said at least one switch.

7. A device according to claim 5, wherein each of said n memories of each of said assemblies comprise two portions, each of said assemblies further comprising:
   a plurality of selection means comprising a first selection means connected between said n memories and said connection means, and a second selection means connected between said n memories and said combination means, for alternating a connection between said n inputs and said two portions of each of said n memories, and for alternating a connection between said two portions of each of said n memories and said combination means such that as a first of said portions of said n memories is being written to, a second of said portions of said n memories can be read from and outputted to said combination means.

8. A device according to claim 5, wherein said combination means of each of said assemblies comprises an adder for successively adding said signals stored in said n memories thereof.

* * * * *